United States Patent
van Leeuwen et al.

(10) Patent No.: US 6,883,372 B2
(45) Date of Patent: Apr. 26, 2005

(54) AIRBORNE GRAVITY GRADIOMETERS

(75) Inventors: Edwin Hans van Leeuwen, Brighton (AU); Ken G. McCracken, Via Mittagong (AU); James Beresford Lee, New Lambton Heights (AU); Robert John Turner, Shortland (AU)

(73) Assignee: BHP Billiton Innovation Pty Ltd, Melbourne (AT)

( * ) Notice: Subject to any disclaimer, the term of this patent is extended or adjusted under 35 U.S.C. 154(b) by 0 days.

(21) Appl. No.: 10/480,763

(22) PCT Filed: Jun. 13, 2002

(86) PCT No.: PCT/AU02/00773

§ 371 (c)(1),
(2), (4) Date: Jun. 3, 2004

(87) PCT Pub. No.: WO02/103399

PCT Pub. Date: Dec. 27, 2002

(65) Prior Publication Data

US 2004/0211255 A1 Oct. 28, 2004

(30) Foreign Application Priority Data

Jun. 15, 2001 (AU) .............................................. PR5713

(51) Int. Cl.⁷ ................................................. G01V 7/16
(52) U.S. Cl. ................................................. 73/382 G
(58) Field of Search .......................... 73/382 G, 382 R, 73/1.38, 1.39; 702/2, 5

(56) References Cited

U.S. PATENT DOCUMENTS

| 5,357,802 A | * | 10/1994 | Hofmeyer et al. | ......... 73/382 G |
| 5,728,935 A | * | 3/1998 | Czompo | .................... 73/382 G |
| 5,734,104 A | * | 3/1998 | Panenka | .................... 73/382 G |
| 5,922,951 A | * | 7/1999 | O'Keefe et al. | .......... 73/382 G |

* cited by examiner

*Primary Examiner*—Helen Kwok
(74) *Attorney, Agent, or Firm*—Gray Cary Ware & Freidenrich, LLP

(57) ABSTRACT

This invention concerns gravity gradiometers for airborne surveys for minerals. The gravity gradiometer comprises an inertially stabilized platform, a rotor that is between 0.4 and 1.5 m in diameter mounted in the stabilized platform, and between twelve and seventy two accelerometers arranged in complements of four each on the rotor; and a signal processor operative to: (i) subtract noise calculated from the mass distribution of the aircraft and the inertially stabilised platform, and by the angles of the gimbals of the stabilised platform; (ii) use measures of the accelerations experienced by the gravity gradiometer to estimate the sensitivities of the gravity gradiometer to the acceleration, and use this estimate to correct the gravity gradiometer output; and (iii), use measures of the rotations to which the gravity gradiometer is subjected to calculate the contribution of rotation to the gravity gradiometer noise, and to remove the contribution of rotation to said gravity gradiometer noise.

3 Claims, 2 Drawing Sheets

AIRBORNE GRAVITY GRADIOMETERS

TECHNICAL FIELD

This invention concerns gravity gradiometers for airborne surveys for minerals.

BACKGROUND ART

U.S. Pat. No. 5,357,802 (Hofmeyer) describes how a gravity gradiometer may be constructed with plural accelerometers carried by a rotating disc to find changes in the magnitude of the gravitational field.

Hofmeyer also describes how using a matched pair of accelerometers mounted on opposite ends of a common diameter of the disc facilitates comparison of the signals produced. In addition this arrangement provides for cancellation of any displacement of the gradiometer. Such an instrument is said to employ a disc rotation rate of about 15 rpm (revolutions per minute).

Hofmeyer then goes on to describe a problem which arises when it is desirable to increase the rotational rate of the disc, say up to 50 or, 100 rpm. This problem arises when the mass to be sensed moves past the gravity gradiometer (or vice versa) in a time which is short compared with the rotation period of the gravity gradiometer. It exhibits itself as noise in the form of additional signals which are a function of the rotational speed of the disc.

Hofmeyer addresses this problem by proposing the use of a set of four accelerometers mounted on a rotating disc. The four accelerometers are arranged in two opposed pairs mounted at the ends of perpendicular diameters. Signal processing is accomplished by adding signals of diametrically opposed accelerometers to obtain sum signals, then taking the difference between the sum signals and demodulating the difference at twice the rotational frequency. The output signal includes a higher order frequency term as a function of rotational frequency. This rotational frequency term can be cancelled by subtraction from another signal obtained from another identical set of four accelerometers.

The problem dealt with by Hofmeyer is not generally an issue in airborne surveys for minerals. Here the spatial extent of a deposit, and the spreading of the gravity gradient effect of the deposit due to the separation of the deposit from the aircraft, mean that the extent of the anomaly is generally of the order of 400 m and at common survey speeds, such as 70 m/s, this is greater than the period of rotation.

SUMMARY OF THE INVENTION

The invention is a gravity gradiometer for airborne surveys for minerals, comprising an inertially stabilised platform, a rotor that is between 0.4 and 1.5 m in diameter mounted in the stabilised platform, and between twelve and seventy two accelerometers arranged in complements of four each on the rotor; and a signal processor operative to:

(i) subtract noise calculated from the mass distribution of the aircraft and the inertial platform, and by the angles of the gimbals of the stabilised platform;

(ii) use measures of the accelerations experienced by the gravity gradiometer to estimate the sensitivities of the gravity gradiometer to the acceleration, and use this estimate to correct the gravity gradiometer output; and (iii) use measures of the rotations to which the gravity gradiometer is subjected to calculate the contribution of rotation to the gravity gradiometer noise, and to remove it.

In some embodiments the diameter may be between 0.5 m and 1.2 m, and a diameter of about 0.6 m had been found to be particularly useful.

The inertially stabilised platform isolates the gravity gradiometer from rotational motion to a high degree. This is necessary because the gravity gradiometer is directly sensitive to rotations about axes in the plane in which the accelerometers are mounted. Rotation rates as low as 30 $\mu$rad/s are equivalent to a gravity gradient of 1 Eo and the gradient is proportional to the square of the angular rate. The Eo or Eotvos unit is $10^{-9}$ s$^{-2}$.

The sensitivity of a gravity gradiometer is limited by its noise. The noise can be quantified in units of Eo$^2$/Hz which is a measure of the noise power per unit of bandwidth. In these units uncorrelated noise from different sources is additive and the total noise power is the sum of the noise power from each component. Three sources of deterministic noise have been identified which contribute to the noise power of a gravity gradiometer, as follows: (i) self gradient; (ii) residual acceleration sensitivity; and (iii) rotation rates. These are deterministic in that the noise contribution is determined by measurable inputs by a non-random process.

Self gradient noise is the change in gravity gradient sensed by the gravity gradiometer due to changes in the positions of masses in the instrument. These are the result of the masses of the vehicle and the components of the stabilised platform moving relative to the gravity gradiometer as the inertial platform compensates. This noise is determined by the mass distribution of the aircraft and the inertial platform and by the angles of the gimbals of the stabilised platform. It can therefore be removed by subtraction of the calculated contribution.

The residual acceleration sensitivity means that the gravity gradiometer output will have a contribution which is proportional to the accelerations experienced by the gravity gradiometer. These accelerations can be measured and by correlation of the gravity gradiometer output with these measurements the sensitivities of the gravity gradiometer to the acceleration can be estimated. This estimate can then be used to correct the gravity gradiometer output for this residual sensitivity.

The rotation rates of the platform on which the gravity gradiometer is mounted are generally controlled by a servo loop which uses gyroscopes to sense the inertial rotation of the platform and applies a correcting torque to the platform via torque motors. The gyroscopes used in this servo loop provide a direct measure of the rotations to which the gravity gradiometer is mounted, and these measures can be used to calculate the contribution of rotation to the gravity gradiometer noise, and to remove it.

It can be seen from this that three of the contributions to the noise in the gravity gradiometer are able to be modelled and corrected by use of ancillary measurements. As we have said, these noise contributions are referred to as deterministic.

The intrinsic noise of the gravity gradiometer is not deterministic. Its source is random noise in the electric circuits of the accelerometers of the gravity gradiometer, or from brownian motion of gas molecules in the accelerometers. The intrinsic noise therefore represents the noise floor of the gravity gradiometer. In attempting to reduce the noise in the gravity gradiometer in order to improve its performance for detection of gravity gradients associated with mineral deposits, this noise source is critical. This noise also limits the accuracy with which the residual acceleration sensitivities can be estimated, and the accuracy of the mass model which can be derived from measurements, and thereby it limits the noise reduction of these deterministic sources.

The present invention also addresses this in two ways. First, by increasing the separation of the accelerometers, which will increase the signal, but will not increase the intrinsic noise. And second, by increasing the number of sensors (accelerometer complements) which are used to measure the gradient. In this case the intrinsic noise is also increased, but since the noise in any single sensor is uncorrelated with the noise in any other sensor, the noise will partially cancel and the intrinsic noise power will be proportional to the inverse of the number of complements.

Both of these means of decreasing the intrinsic noise will also reduce the residual acceleration sensitivity component of the noise, as that noise is not dependent on the separation between the sensors and is uncorrelated between complements.

Neither of the proposed means of reducing the intrinsic noise has any effect on either of the self gradient noise (as this is a true gravity gradient), or the rotation rate noise, which mimics a gravity gradient (it is an acceleration gradient). Therefore the benefit will only be obtained if the deterministic noise sources are sufficiently small, or are sufficiently reduced by modelling their effect.

Use of the invention will allow detection of targets having gravity gradients of, say, 10 Eo. The magnitude of the gradient decreases rapidly with reciprocal of the cube of the distance of the deposit from the measurement point. A significant deposit which is at the surface, and therefore 100 m away from a survey aircraft, may have an anomalous gravity gradient of 100 Eo while the same deposit which is buried at a depth of 100 m below the ground surface, and therefore 200 m below the survey aircraft, will have an anomalous gravity gradient of only 12 Eo. Such a deposit may still be economic to mine as deposits at this depth are commonly mined if the deposit grade is satisfactory. The invention will therefore allow such deposits to be detected.

The size of the instrument could, in theory, be increased without limit to continually improve intrinsic noise performance. However, the inventors have found practical limitations in the construction and carriage of such instruments that determine the upper ranges of size and number of accelerometers.

BRIEF DESCRIPTION OF THE DRAWINGS

An example of the invention will now be described with reference to the accompanying drawings, in which.

BEST MODES OF THE INVENTION

Figure 1:
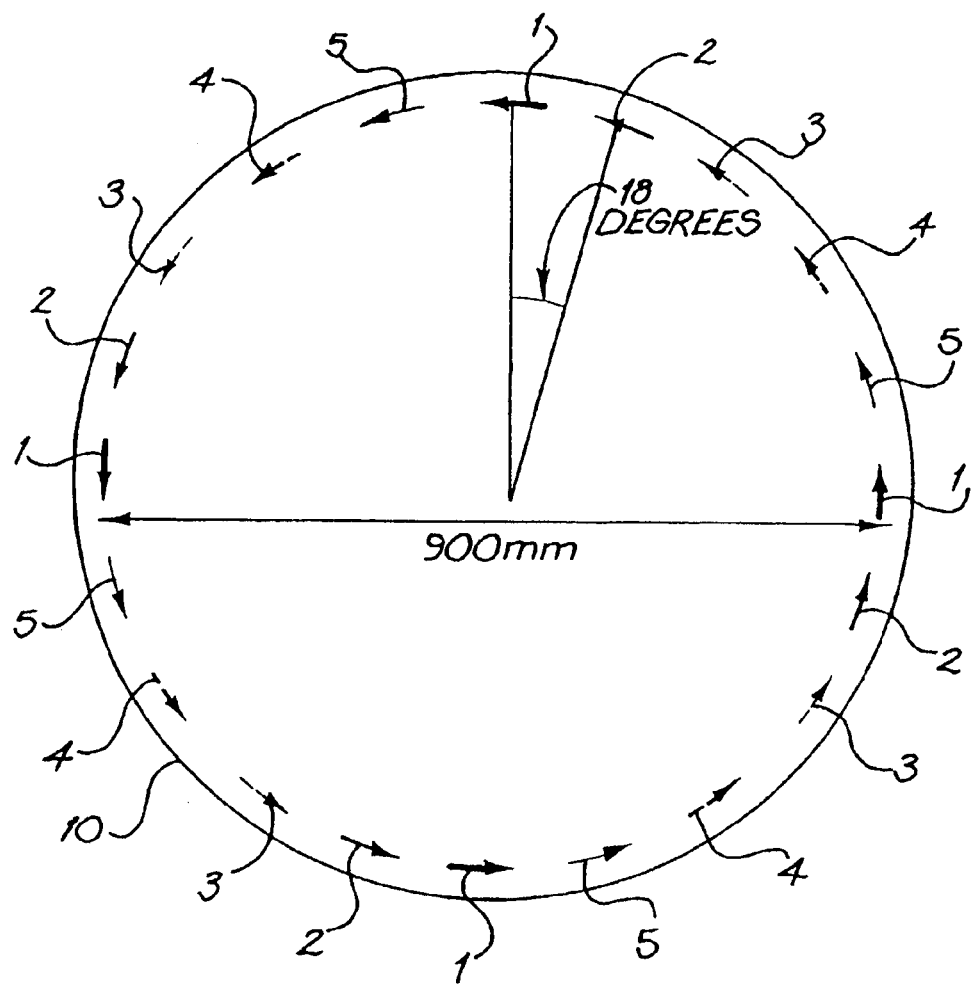
FIG. 1 is a diagram showing the arrangement of accelerometers on the rotor of a gravity gradiometer.

In FIG. 1 twenty sensors are arranged in five sets of complements 1, 2, 3, 4 and 5, mounted on a single rotor disk aligned with their sensitive axes equispaced on a disc rotor 10 of diameter 900 mm. Each compliment is rotated by 18 degrees with respect to the next complement. When compared with a single set, this arrangement will have a lower intrinsic noise power by a factor of 22.5.

Figure 2:
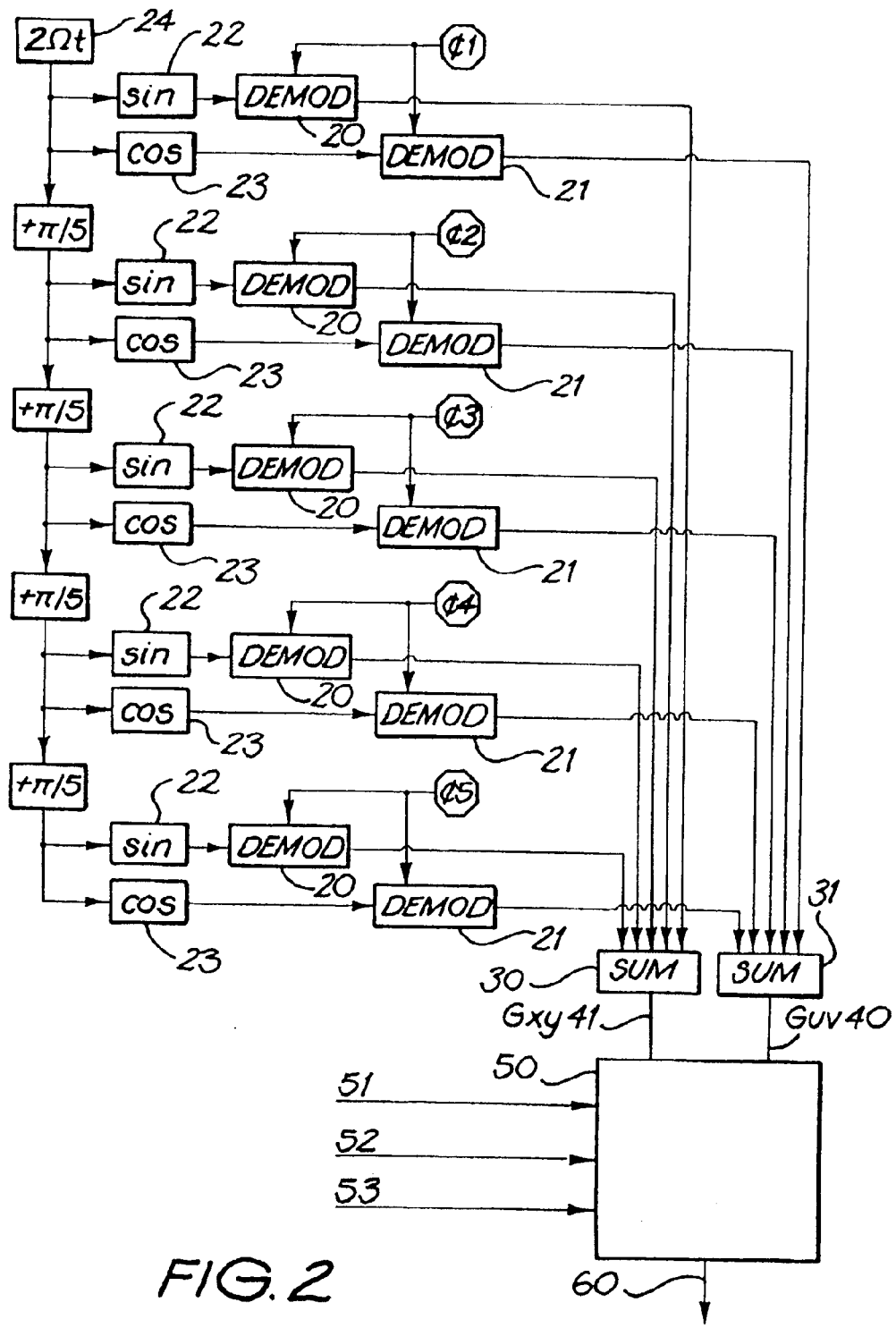
FIG. 2 is a diagram showing the processing of five complements of accelerometers of FIG. 1.

The outputs of the five complements 1, 2, 3, 4 and 5 are combined as shown in FIG. 2. The complement outputs are demodulated 20, 21 by multiplying by sin 22 and cosine 23 of twice the angle 24 of the complement relative to a reference orientation. The angular frequency of rotation, $2\Omega t$, is phase shifted by $\pi/5$ radians between the demodulators of each complement to provide the demodulation signals. Therefore the phase of the sinusoids used to demodulate each complement differ by twice the angles by which they are rotated relative to each other. The sine and cosine demodulation products are separately summed 30 and 31 to give inline 40 and cross gradient 41 outputs.

The inline 40 and cross gradient 41 outputs are applied to a signal processor 50.

The signal processor receives information 51 about the mass distribution of the aircraft and the inertial platform as the gimbals of the stabilized platform move. Processor 50 uses this information to calculate the gravitational noise and subtracts this from the output.

The change in gravity gradient sensed by the gravity gradiometer due to changes in the positions of masses in the instrument is known as self gradient noise. This is the result of the masses of the vehicle and the components of the stabilised platform moving relative to the gravity gradiometer as the inertial platform compensates. This noise is determined by the mass distribution of the aircraft and the inertial platform and by the angles of the gimbals of the stabilised platform. It can therefore be removed by subtraction of the calculated contribution.

Processor 50 also receives measures of the accelerations experienced by the gravity gradiometer 52 to estimate the sensitivities of the gravity gradiometer to the acceleration. Processor 50 uses this estimate to correct the gravity gradiometer output.

The residual acceleration sensitivity means that the gravity gradiometer output will have a contribution which is proportional to the accelerations experienced by the gravity gradiometer. These accelerations can be measured and by correlation of the gravity gradiometer output with these measurements the sensitivities of the gravity gradiometer to the acceleration can be estimated. This estimate can then be used to correct the gravity gradiometer output for this residual sensitivity.

Processor 50 also receives measures of the rotations to which the gravity gradiometer is subjected 53 to calculate the contribution of rotation to the gravity gradiometer noise, and the processor removes it.

Processor 50 then provides a corrected output 60.

The rotation rates of the platform on which the gravity gradiometer is mounted are generally controlled by a servo loop which uses gyroscopes to sense the inertial rotation of the platform and applies a correcting torque to the platform via torque motors. The gyroscopes used in this servo loop provide a direct measure of the rotations to which the gravity gradiometer is mounted, and these measures can be used to calculate the contribution of rotation to the gravity gradiometer noise, and to remove it.

It can be seen from this that three of the contributions to the noise in the gravity gradiometer are able to be modelled and corrected by use of ancillary measurements. As we have said, these noise contributions are referred to as deterministic.

Another example could have 16 sensors arranged in four complements mounted on a single rotor disk aligned with their sensitive axes equispaced on a circle of diameter 600 mm. In this simple embodiment the sixteen sensors can be arranged as two sets of 8 sensors. The two sets would be rotated 22.5 degrees with respect to each other, but any degree of rotation of one with respect to another is possible without detriment. When compared with a single set, this example will have lower intrinsic noise power by a factor of 8.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A gravity gradiometer for airborne surveys for minerals, comprising an inertially stabilised platform, a rotor that is between 0.4 and 1.5 m in diameter mounted in the stabilised platform, and between twelve and seventy two accelerometers arranged in complements of four each on the rotor; and a signal processor operative to:

(i) subtract noise calculated from a mass distribution of an aircraft and the inertially stabilised platform, and by angles of gimbals of the stabilised platform;

(ii) use measured accelerations experienced by the gravity gradiometer to estimate the sensitivities of the gravity gradiometer to the accelerations, and use the estimate to correct a gravity gradiometer output; and (iii) use measured rotations to which the gravity gradiometer is subjected to calculate a contribution of rotation to a gravity gradiometer noise, and to remove the contribution of rotation to said gravity gradiometer noise.

2. A gravity gradiometer according to claim 1, where the diameter of the rotor is between 0.5 m and 1.2 m.

3. A gravity gradiometer according to claim 2, where the diameter of the rotor is about 0.6 m.

* * * * *